United States Patent
Feng

(10) Patent No.: US 12,535,230 B2
(45) Date of Patent: Jan. 27, 2026

(54) COMPACT DEHUMIDIFIER ASSEMBLIES

(71) Applicant: GD Midea Air Conditioning Equipment Co., Ltd., Foshan (CN)

(72) Inventor: Yinshan Feng, Jeffersonville, IN (US)

(73) Assignee: Midea Group Co., Ltd., Foshan (CN)

( * ) Notice: Subject to any disclaimer, the term of this patent is extended or adjusted under 35 U.S.C. 154(b) by 183 days.

(21) Appl. No.: 18/435,181

(22) Filed: Feb. 7, 2024

(65) Prior Publication Data
US 2025/0251151 A1 Aug. 7, 2025

(51) Int. Cl.
*F24F 1/029* (2019.01)
*F24F 1/022* (2019.01)
*F24F 1/0358* (2019.01)

(52) U.S. Cl.
CPC .............. *F24F 1/029* (2019.02); *F24F 1/022* (2013.01); *F24F 1/0358* (2019.02)

(58) Field of Classification Search
CPC .......... F24F 1/029; F24F 1/0358; F24F 1/022; F24F 1/028; F24F 1/0287; F24F 13/20; F24F 2013/202; F24F 2013/205
See application file for complete search history.

(56) References Cited

U.S. PATENT DOCUMENTS

| 7,424,907 | B2 | 9/2008 | Chou et al. | |
|---|---|---|---|---|
| 9,054,273 | B2 | 6/2015 | Huang et al. | |
| 2005/0255420 | A1 | 11/2005 | Lim | |
| 2019/0137121 | A1* | 5/2019 | Swanson | F24F 1/028 |
| 2021/0333010 | A1* | 10/2021 | Yang | F24F 13/222 |
| 2023/0101954 | A1* | 3/2023 | Xing | F24F 13/20 |
| | | | | 62/271 |

FOREIGN PATENT DOCUMENTS

| CN | 210832410 U | 6/2020 |
|---|---|---|
| CN | 214070309 U | 8/2021 |
| CN | 218721949 U | 3/2023 |

* cited by examiner

Primary Examiner — Joseph F Trpisovsky
(74) Attorney, Agent, or Firm — Dinsmore & Shohl LLP

(57) ABSTRACT

A dehumidifier assembly may include a housing having a top wall, a bottom wall, and one or more side walls. The top wall, bottom wall, and one or more side walls may define an internal cavity. A compressor may be disposed within the internal cavity adjacent to the bottom wall of the housing. A motor may be disposed within the internal cavity adjacent to the top wall of the housing, wherein the motor is a tip-magnetic driven motor. A heat exchanger may be disposed within the internal cavity and adjacent to at least one of the one or more side walls.

20 Claims, 2 Drawing Sheets

COMPACT DEHUMIDIFIER ASSEMBLIES

BACKGROUND

The present embodiments relate to compact dehumidifier assemblies, with particular embodiments shown for tip-magnetic driven motor dehumidifiers, centrally-mounted compressor dehumidifiers, and increased surface area heat exchanger dehumidifiers.

A dehumidifier may be used inside buildings to remove moisture content from the air. Typically, they may be used in damp environments, such as basements or storage rooms. In some cases, it may be advantageous to decrease the footprint of the dehumidifier while maintaining the performance, in order to allow for the dehumidifier to take up less space within the environment in which it is placed or allow for a higher capacity dehumidifier to be placed within the same amount of space as a lower capacity dehumidifier.

Typical dehumidifier assemblies may include a fan with a centrally mounted hub which includes a motor, a control system, and brackets for mounting the fan to the dehumidifier. This may force the compressor of the dehumidifier to be mounted off-center within the dehumidifier to provide enough space for the centrally mounted hub. By mounting the compressor off-center, the compressor may be adjacent to one of the sidewalls of the dehumidifier, which may prevent a heat exchanger from being mounted on every sidewall of the dehumidifier because it would interfere with the compressor. In other dehumidifiers, the centrally mounted hub of the fan may force the dehumidifier assembly to increase in height in order to allow sufficient space beneath the centrally mounted hub to mount the compressor.

Thus, there is a need for a compact dehumidifier which may also allow for increased surface area for the heat exchanger to increase efficiency. A need therefore exists in the art for a dehumidifier with a lower-profile motor, centrally mounted compressor, and larger surface area heat exchanger.

SUMMARY

The herein-described embodiments address these and other problems associated with the art by providing compact dehumidifier assemblies. In various embodiments, the dehumidifier assembly may include a housing having a top wall, a bottom wall, and one or more side walls. The top wall, bottom wall, and one or more side walls may define an internal cavity. A compressor may be disposed within the internal cavity adjacent to the bottom wall of the housing. A motor may be disposed within the internal cavity adjacent to the top wall of the housing, wherein the motor is a tip-magnetic driven motor. A heat exchanger may be disposed within the internal cavity and adjacent to at least one of the one or more side walls.

In addition, in some embodiments the dehumidifier assembly may include a housing having a top wall, a bottom wall, and one or more side walls. The top wall, bottom wall, and one or more side walls may define an internal cavity, wherein the bottom wall may have a center point. A compressor may be disposed within the internal cavity adjacent to the bottom wall of the housing. The compressor may include a top face and a bottom face. The bottom face of the compressor may include a center point. The center point of the bottom face of the compressor may be aligned with the center point of the bottom wall of the housing. A motor may be disposed within the internal cavity adjacent to the top wall of the housing. A heat exchanger may be disposed within the internal cavity and adjacent to at least one of the plurality of side walls.

In addition, in some embodiments the dehumidifier assembly may include a housing having a top wall, a bottom wall, a first side wall, a second side wall, a third side wall, and a fourth side wall. The top wall, bottom wall, first side wall, second side wall, third side wall, and fourth side wall may define an internal cavity. A compressor may be disposed within the internal cavity adjacent to the bottom wall of the housing. A motor may be disposed within the internal cavity adjacent to the top wall of the housing. A heat exchanger may be disposed within the internal cavity and at least partially spanning across the first side wall, the second side wall, the third side wall, and the fourth side wall.

These and other advantages and features are set forth in the claims annexed hereto and forming a further part hereof. However, for a better understanding of the invention, and of the advantages and objectives attained through its use, reference should be made to the figures, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used in any way to the scope of the claimed subject matter.

DETAILED DESCRIPTION

Figure 1:
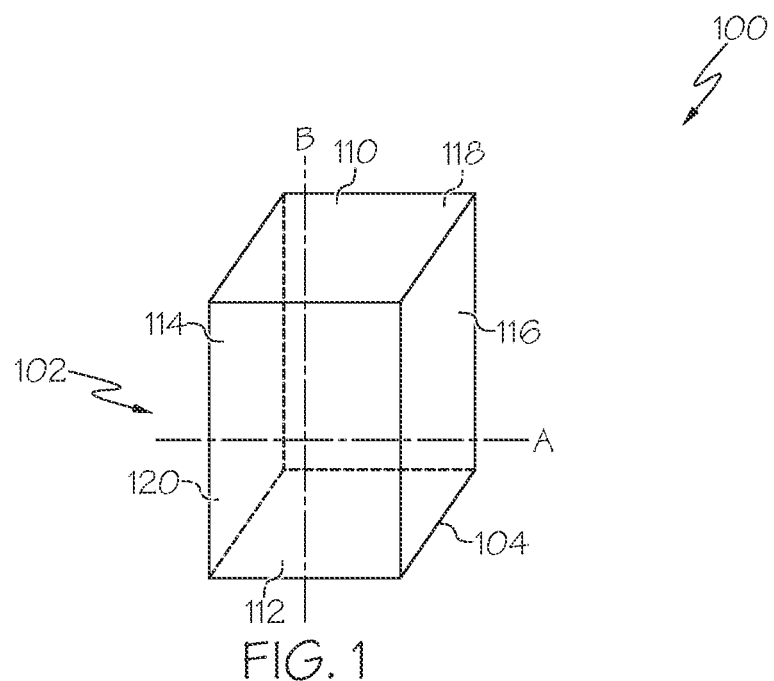
FIG. 1 is an isometric view of a dehumidifier assembly.

Turning now to the drawings, wherein like numbers denote like parts throughout the several views, FIG. 1 illustrates an example dehumidifier assembly 100. The dehumidifier assembly 100 includes a housing 104. The housing 104 is made of a top wall 110 and a bottom wall 112 (shown in phantom in FIG. 1). The housing 104 is also made of one or more side walls 102. The top wall 110, the bottom wall 112, and the one or more side walls 102 define an internal cavity 122. The internal cavity 122 may be shaped and sized to accommodate various components of the dehumidifier assembly 100, as will be described in more detail herein.

As illustrated, the dehumidifier assembly 100 includes a first side wall 114, a second side wall 116, a third side wall 118 (shown in phantom in FIG. 1), and a fourth side wall 120 (shown in phantom in FIG. 1). However it should be understood that, in embodiments, any suitable number of side walls may be used, such as one side wall, three side walls, five side walls, eight side walls, or any other suitable number of side walls.

As illustrated, the dehumidifier assembly 100 forms a rectangular prism. However it should be understood that in embodiments, the dehumidifier assembly 100 may form any other suitable shape, including but not limited to a cylinder, a hexagonal prism, or any other suitable shape.

One or more of the one or more side walls 102 may include vents, slots, louvers, or various other features to allow for air flow from outside of the internal cavity 122 into the internal cavity 122 and vice-versa. The top wall 110 and/or the bottom wall 112 may include vents, slots, louvers, or various other features to allow for air flow from outside of the internal cavity 122 into the internal cavity 122.

Each of the top wall 110, bottom wall 112, and one or more side walls 102 may be constructed of any suitable material, including but not limited to plastic, steel, aluminum, or any other suitable material.

In some embodiments, the one or more side walls 102 may be constructed of a single piece of material, such as being molded into a single piece of plastic. In embodiments, the top wall 110 or the bottom wall 112 may further be molded as a single piece of plastic with the one or more side walls 102. In further embodiments, the one or more side walls 102 may be constructed of separate pieces and coupled to one another with any suitable fastening mechanism, such as clips, mechanical fasteners, geometric fit, hinges, or any other suitable fastening mechanism.

Figure 2:
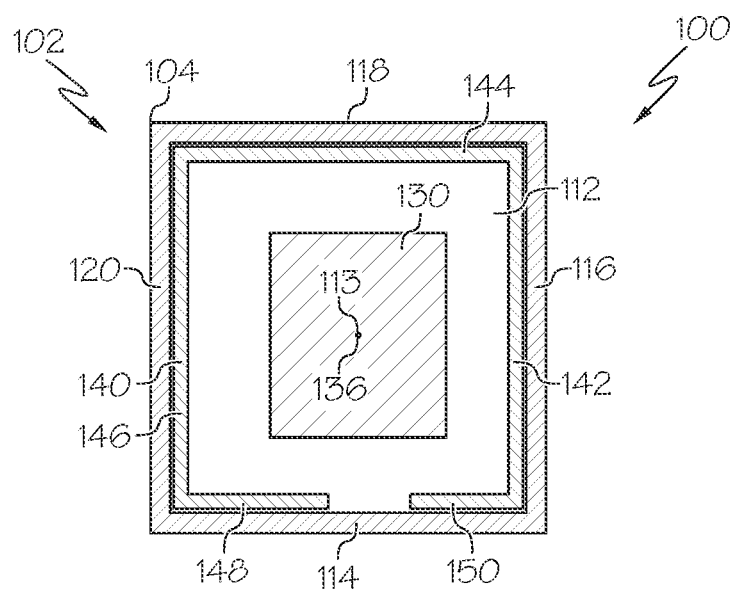
FIG. 2 is a section view a dehumidifier assembly, consistent with some embodiments of the dehumidifier assembly.

FIG. 2 illustrates a section view of the dehumidifier assembly 100 along axis A (shown in FIG. 1). The bottom wall 112 includes a center point 113. The center point 113 is located at the geometric center of the bottom wall 112.

The dehumidifier assembly 100 includes a compressor 130. The compressor 130 may include a top face 132 and a bottom face 134. The compressor 130 is disposed within the internal cavity 122 adjacent to the bottom wall 112 of the dehumidifier assembly 100. The compressor 130 includes a center point 136 along the bottom face 134. In embodiments, the center point 136 of the bottom face 134 may be aligned with the center point 113 of the bottom wall 112, such that the compressor 130 is centered within the internal cavity 122 along the bottom wall 112.

In further embodiments not illustrated, the center point 136 of the bottom face 134 of the compressor 130 may be offset from the center point 113 of the bottom wall 112.

The compressor 130 may compress a refrigerant for circulation within a refrigeration system held within the internal cavity 122.

The dehumidifier assembly 100 includes a heat exchanger 140. As illustrated, the heat exchanger 140 includes a first segment 142, a second segment 144, a third segment 146, a fourth segment 148, and a fifth segment 150. The first segment 142 may span across the second side wall 116. The second segment 144 may span across the third side wall 118. The third segment 146 may span across the fourth side wall 120. The fourth segment 148 and the fifth segment 150 may span across the first side wall 114.

In embodiments, the first segment 142, the second segment 144, the third segment 146, the fourth segment 148, and the fifth segment 150 may form a single fluidly connected heat exchanger 140. In further embodiments, each of the first segment 142, the second segment 144, the third segment 146, the fourth segment 148, and the fifth segment 150 may form individual heat exchangers such that the dehumidifier assembly 100 includes multiple heat exchangers 140.

The heat exchanger 140 may cool the refrigerant circulating through the refrigeration system inside of the dehumidifier assembly 100. The heat exchanger 140 may be any suitable type of heat exchanger, including but not limited to a finned tube heat exchanger, a shell and tube heat exchanger, a plate heat exchanger, or any other suitable type of heat exchanger.

By increasing the surface area of the heat exchanger 140 relative to the housing 104, the efficiency of the dehumidifier assembly 100 may be increased relative to a dehumidifier assembly with a heat exchanger with a smaller surface area. In further embodiments, by increasing the size of the heat exchanger 140 relative to the housing 104, the overall size of the housing 104 may be reduced, which may allow the dehumidifier assembly 100 to be more compact relative to a dehumidifier assembly with a larger sized housing.

By coupling the center point 136 of the bottom face 134 of the compressor 130 to the center point 113 of the bottom wall 112, the compressor 130 may be moved away from the one or more side walls 102, which may allow for the heat exchanger 140 to span each of the one or more side walls 102. In conventional dehumidifier assemblies, the compressor is offset from the center point 113 of the bottom wall 112, which may prevent the heat exchanger 140 from at least partially spanning each of the one or more walls of the dehumidifier housing because the compressor 130 may interfere with the heat exchanger 140.

Figure 3:
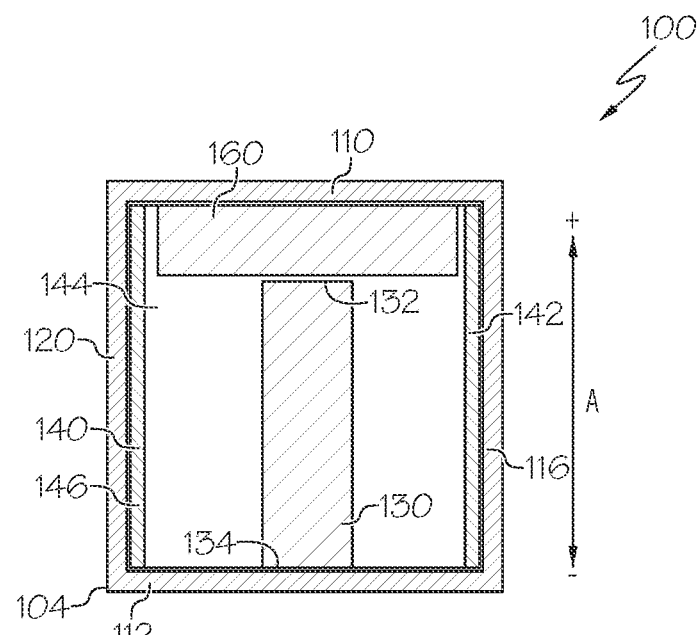
FIG. 3 is a section view a dehumidifier assembly, consistent with some embodiments of the dehumidifier assembly.

FIG. 3 illustrates another section view of the dehumidifier assembly 100 along axis B (shown in FIG. 1). The dehumidifier assembly 100 includes a motor 160. The motor 160 may be coupled to at least one of the one or more side walls 102.

The motor 160 may include a top face 162 and a bottom face 164. The motor 160 may be mounted vertically above the compressor 130, where axis A is vertical and the positive side indicates an upward direction.

In embodiments, the motor 160 is a magnetic-tip driven motor, as will be described in more detail herein. Magnetic-tip driven motors may have a smaller distance between the top face 162 and the bottom face 164 to form a smaller profile motor, compared to conventional motors with a centrally mounted hub. The lower profile of the motor 160 may allow for the compressor 130 to be placed vertically below the motor 160 while maintaining the same height of the housing 104, as opposed to the compressor 130 being offset and partially to the side of the motor 160. This may allow the heat exchanger 140 to span across each of the one or more side walls 102 (illustrated and described in FIG. 2). However it should be understood that, in embodiments, the compressor 130 may be placed partially to the side of the motor 160.

In other embodiments, any other suitable type of motor may be used, such as a center-driven motor.

The motor 160 may be configured to draw airflow through the one or more side walls 102 (when equipped with vents, slots, louvers, or various other features as described above) with one or more fan blades 172 (illustrated in FIG. 4), through the heat exchanger 140, and exhaust the airflow out of the top wall 110. This airflow may cool the refrigerant circulating through the heat exchanger 140.

In embodiments, the dehumidifier assembly 100 may include various other components which may be fluidly coupled to the compressor 130 and the heat exchanger 140, such as a condenser, an evaporator, pipes, or various other components not illustrated. The various other components may function in concert with the compressor 130, the heat exchanger 140, and/or the motor 160 in order to remove moisture from air and dehumidify the room in which the dehumidifier assembly 100 is configured.

Figure 4:
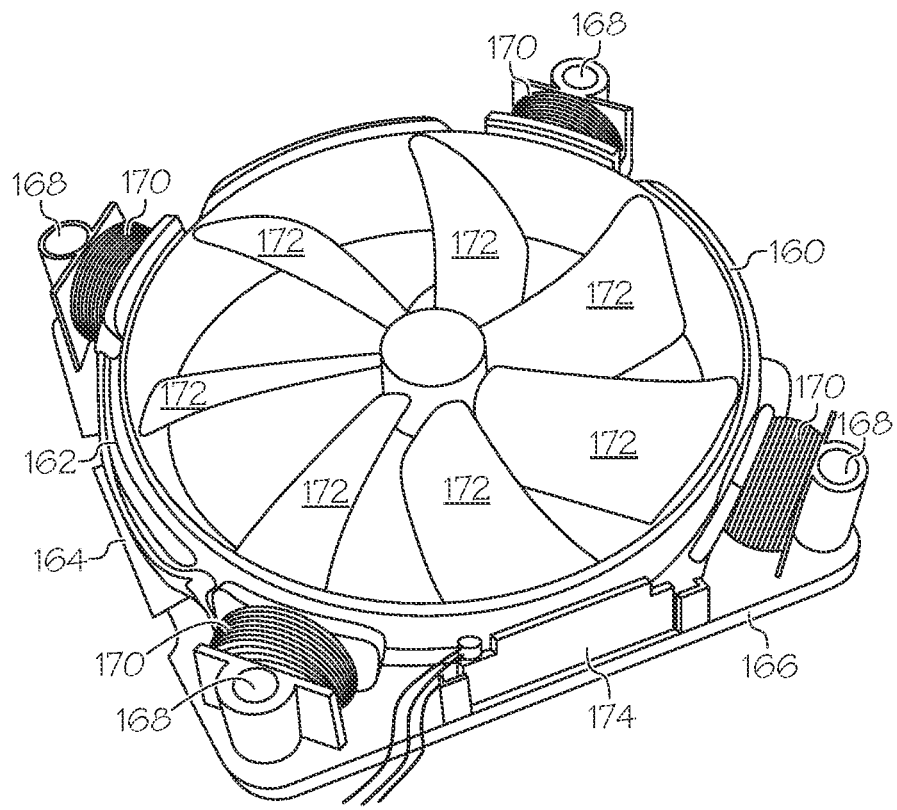
FIG. 4 is a view of magnetic-tip driven motor of a dehumidifier assembly, consistent with some embodiments of the dehumidifier assembly.

FIG. 4 illustrates an embodiment of the motor 160. The motor 160 is illustrated as a magnetic-tip driven motor. The motor 160 may include a perimeter 166. The perimeter 166 may surround the outer edges of the motor 160.

The motor 160 may include one or more mounting holes 168. As illustrated, the motor 160 includes four mounting holes 168, but it should be understood that in embodiments, any suitable number of mounting holes 168 may be included, such as one mounting hole 168, two mounting holes 168, five mounting holes 168, or any other suitable number of mounting holes 168.

The mounting holes 168 may be shaped and sized to allow for the passage of fasteners (not illustrated) through the one or more mounting holes 168. The fasteners may be used to couple the motor 160 to the housing 104. In further embodiments, the motor 160 may include various other fastening mechanisms for coupling the motor 160 to the housing 104, including but not limited to clips, geometric fit, hinges, or any other suitable fastening mechanism.

The motor 160 may include one or more fan blades 172. While seven fan blades 172 are illustrated, it should be understood than in embodiments, any suitable number of fan blades 172 may be used.

The motor 160 may include one or more magnetic coils 170. The one or more magnetic coils 170 may be arranged around the perimeter 166 of the motor 160. The magnetic coils 170 may interact with one or more magnets to rotate the fan blades 172. While four magnetic coils 170 are illustrated, it should be understood that in embodiments, any suitable number of magnetic coils 170 may be used.

A controller 174 may be communicatively coupled to the motor 160. The controller 174 may be configured to control the motor 160, such as powering the motor 160 on and off, controlling a speed of the motor 160, or various other functions. In some embodiments, the controller 174 may be communicatively coupled to a humidity sensor (not shown) and be configured to automatically control the motor 160 to maintain a target humidity level. In further embodiments, the controller 174 may be communicatively coupled to a user interface (not shown) to allow a user to selectively control the motor 160.

Numerous variations and modifications to the dehumidifier assembly 100 illustrated in FIGS. 1-4 will be apparent to one of ordinary skill in the art, as apparent from the description above. Therefore, the invention is not limited to the specific implementations discussed herein.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A dehumidifier assembly comprising:
   a housing having a top wall, a bottom wall, and one or more side walls, the top wall, the bottom wall, and the one or more side walls defining an internal cavity;
   a compressor disposed within the internal cavity adjacent to the bottom wall of the housing;
   a motor disposed within the internal cavity adjacent to the top wall of the housing, wherein the motor is a tip-magnetic driven motor; and
   a heat exchanger disposed within the internal cavity and adjacent to at least one of the one or more side walls.

2. The dehumidifier assembly of claim 1, wherein:
   the compressor further comprises a top face, a bottom face, the bottom face having a center point;
   the bottom wall further comprises a center point; and
   the center point of the bottom face of the compressor is aligned with the center point of the bottom wall.

3. The dehumidifier assembly of claim 1, wherein the housing comprises a first side wall, a second side wall, a third side wall, and a fourth side wall and the housing forms a rectangular prism.

4. The dehumidifier assembly of claim 3, wherein the heat exchanger at least partially spans across the first side wall, the second side wall, the third side wall, and the fourth side wall.

5. The dehumidifier assembly of claim 1, wherein the motor further comprises one or more mounting holes.

6. The dehumidifier assembly of claim 5, wherein the motor further comprises a perimeter, and the one or more mounting holes are arranged around the perimeter.

7. The dehumidifier assembly of claim 1, wherein the motor further comprises:
   a perimeter; and
   one or more magnetic coils, wherein the one or more magnetic coils are arranged around the perimeter.

8. The dehumidifier assembly of claim 1, wherein the compressor is mounted vertically beneath the motor.

9. A dehumidifier assembly comprising:
   a housing having a top wall, a bottom wall, and one or more side walls, the top wall, the bottom wall, and the one or more side walls defining an internal cavity, wherein the bottom wall comprises a center point;
   a compressor disposed within the internal cavity adjacent to the bottom wall of the housing, wherein:
      the compressor comprises a top face and a bottom face, the bottom face having a center point; and
      the center point of the bottom face of the compressor is aligned with the center point of the bottom wall of the housing;
   a motor disposed within the internal cavity adjacent to the top wall of the housing; and
   a heat exchanger disposed within the internal cavity and adjacent to at least one of the one or more side walls.

10. The dehumidifier assembly of claim 9, wherein the compressor is mounted vertically beneath the motor.

11. The dehumidifier assembly of claim 9, wherein the housing comprises a first side wall, a second side wall, a third side wall, and a fourth side wall and the housing forms a rectangular prism.

12. The dehumidifier assembly of claim 11, wherein the heat exchanger at least partially spans across the first side wall, the second side wall, the third side wall, and the fourth side wall.

13. The dehumidifier assembly of claim 9, wherein the motor further comprises one or more mounting holes.

14. The dehumidifier assembly of claim 13, wherein the motor further comprises a perimeter, and the one or more mounting holes are arranged around the perimeter.

15. A dehumidifier assembly comprising:
   a housing having a top wall, a bottom wall, a first side wall, a second side wall, a third side wall, and a fourth side wall, the top wall, the bottom wall, the first side wall, the second side wall, the third side wall, and the fourth side wall defining an internal cavity;
   a compressor disposed within the internal cavity adjacent to the bottom wall of the housing;
   a motor disposed within the internal cavity adjacent to the top wall of the housing; and
   a heat exchanger disposed within the internal cavity and at least partially spanning across the first side wall, the second side wall, the third side wall, and the fourth side wall.

16. The dehumidifier assembly of claim 15, further comprising:
   the compressor comprising a top face and a bottom face, wherein the bottom face has a center point; and
   the bottom wall of the housing having a center point; the center point of the bottom face of the compressor is aligned with the center point of the bottom wall of the housing.

17. The dehumidifier assembly of claim 15, wherein the compressor is mounted vertically beneath the motor.

18. The dehumidifier assembly of claim 15, wherein the motor further comprises one or more mounting holes.

19. The dehumidifier assembly of claim 18, wherein the motor further comprises a perimeter, and the one or more mounting holes are arranged around the perimeter.

20. The dehumidifier assembly of claim 15, wherein the housing further comprises a rectangular prism.

\* \* \* \* \*